(12) United States Patent
Kuo et al.

(10) Patent No.: US 8,753,015 B2
(45) Date of Patent: Jun. 17, 2014

(54) CROSSED-ROLLER BEARING

(75) Inventors: Chang-Hsin Kuo, Taichung (TW); Tsung-Hsien Chiang, Taichung (TW); Huang-Sheng Liu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 311 days.

(21) Appl. No.: 13/153,000

(22) Filed: Jun. 3, 2011

(65) Prior Publication Data

US 2012/0308169 A1  Dec. 6, 2012

(51) Int. Cl.
*F16C 19/36* (2006.01)
*F16C 43/06* (2006.01)

(52) U.S. Cl.
CPC ............... *F16C 19/362* (2013.01); *F16C 43/06* (2013.01)
USPC ........................................................ 384/447

(58) Field of Classification Search
CPC ............................... F16C 19/362; F16C 43/06
USPC ......... 384/447, 456, 477, 507, 508, 559, 584, 384/44
See application file for complete search history.

(56) References Cited

U.S. PATENT DOCUMENTS

| | | | | |
|---|---|---|---|---|
| 2,055,714 A | * | 9/1936 | Baker | 384/560 |
| 4,961,653 A | * | 10/1990 | Suzuki et al. | 384/447 |
| 5,026,177 A | * | 6/1991 | Masuda | 384/447 |
| 5,033,873 A | * | 7/1991 | Suzuki | 384/447 |
| 2007/0133910 A1 | * | 6/2007 | Xu et al. | 384/44 |

FOREIGN PATENT DOCUMENTS

| | | |
|---|---|---|
| JP | 2000-65080 | 3/2000 |
| JP | 2000-170754 | 6/2000 |
| JP | 2002-13540 | 1/2002 |
| JP | 2005-180578 | 7/2005 |

\* cited by examiner

*Primary Examiner* — James Pilkington
(74) *Attorney, Agent, or Firm* — Muncy, Geissler, Olds & Lowe, P.C.

(57) ABSTRACT

A crossed-roller bearing includes an inner ring having a first periphery and a first raceway groove formed on the first periphery, the first raceway groove being provided with a complete first raceway surface and a complete second raceway surface; an outer ring sleeved onto the inner ring and having a second periphery, an insertion hole, and a second raceway groove formed on the second periphery and corresponding to the first raceway groove, the second raceway groove being provided with a third raceway surface and a fourth raceway surface, a receiving space being jointly defined by the first, second, third, and fourth raceway surfaces; and a plug, the insertion hole running through one of the third and fourth raceway surfaces to form a breakage therearound; a plurality of rollers mounted in the receiving space to fill the breakage; a plug mounted in the insertion hole and fills the breakage.

18 Claims, 11 Drawing Sheets

CROSSED-ROLLER BEARING

BACKGROUND OF THE INVENTION

1. Field of the Invention

The present invention relates generally to a bearing, and more particularly, to a crossed-roller bearing.

2. Description of the Related Art

A conventional crossed-roller bearing is composed of a plurality of rollers crosswise mounted between an inner ring and an outer ring to allow itself to bear radial, axial, and momental loads. Compared with the general bearing, the crossed-roller bearing is particularly applicable to the circumstances, like tool machines and mechanical arms, in need of high rigidity and rotational accuracy. As disclosed in each of the patents, like Japan Patent Pub. Nos. 2000-65080, 2000-170754, 2002-13540 & 2005-180578, the insertion hole for installing rollers is designed to be perpendicular to the raceway. In this way, two raceway surfaces are formed on each of the bearings and become broken because of the insertion hole, so the loading capacity of the bearing with two broken raceway surfaces is less than that of the bearing with one broken raceway surface.

In addition, the plug adapted to fill the insertion hole should flush with the raceway surfaces under optimal circumstances to keep the raceway surfaces flat. However, the processing inaccuracy still results in roughness between the plug and the raceway surfaces. As far as the conventional crossed-roller bearing is concerned, the plug needs to be designed to make up for the raceway surfaces; otherwise, it tends to happen that the plug flushes with one of the raceway surfaces but the other raceway surface is still rough; namely, the raceway surfaces are very likely rough. Besides, the plug for the aforesaid crossed-roller bearing needs to be processed to have a V-shaped complex hyperboloid in harmony with the raceway surfaces, so such processing is more expensive than that of one single curved surface.

SUMMARY OF THE INVENTION

The primary objective of the present invention is to provide a crossed-roller bearing, which is provided with the breakage located at only one raceway surface to have more loading capacity than the prior art.

The secondary objective of the present invention is to provide a crossed-roller bearing, which is lower in production cost and less likely to have rough raceway.

The foregoing objectives of the present invention are attained by the crossed-roller bearing composed of an inner ring, an outer ring, a plurality of rollers, and a plug. The inner ring includes a first periphery and a first raceway groove formed on the first periphery. The first raceway groove is provided with a complete first raceway surface and a complete second raceway surface. The outer ring is sleeved onto the inner ring and includes a second periphery, an insertion hole, and a second raceway groove formed on the second periphery and corresponding to the first raceway groove. The second raceway groove is provided with a third raceway surface and a fourth raceway surface. A receiving space is jointly defined by the first, second, third, and fourth raceway surfaces. The insertion hole runs through one of the third and fourth raceway surface to form a breakage therearound to keep the contact area between the other raceway surface and either of the rollers unbroken. The rollers are mounted in the receiving space. The plug is mounted in the insertion hole and fills the breakage.

In the aforesaid structure, only the third or fourth raceway surface is broken to result in breakage of only one raceway surface, so the loading capacity of the present invention is more than that of the prior art. Besides, the plug can make up for the breakage and keep the third or fourth raceway surface flat as long as one single curved surface is provided on the plug. The processing cost of the single curved surfaced is lower than that of the V-shaped complex hyperboloid of the prior art and the yield rate of the former is higher than that of the latter.

Under the same spirit, the present invention can provide another embodiment of the crossed-roller bearing composed of an inner ring, an outer ring, a plurality of rollers, and a plug. The inner ring includes a first periphery, an insertion hole, and a first raceway groove formed on the first periphery. The first raceway groove is provided with a first raceway surface and a second raceway surface. The insertion hole runs through one of the first and second raceway surfaces to form a breakage therearound to keep the contact area between the other raceway surface and either of the rollers unbroken. The outer ring is sleeved onto the inner ring and includes a second periphery and a second raceway groove formed on the second periphery and corresponding to the first raceway groove. The second raceway groove is provided with a complete third raceway surface and a complete fourth raceway surface. A receiving space is jointly defined by the first, second, third, and fourth raceway surfaces. The rollers are mounted in the receiving space. The plug is mounted in the insertion hole and fills the breakage.

In the aforesaid structure, only the first or second raceway surface is broken to result in breakage of only one raceway surface. Besides, the plug can make up for the breakage and keep the first or second raceway surface flat as long as one single curved surface is provided on the plug.

DETAILED DESCRIPTION OF PREFERRED EMBODIMENTS

Figure 1:
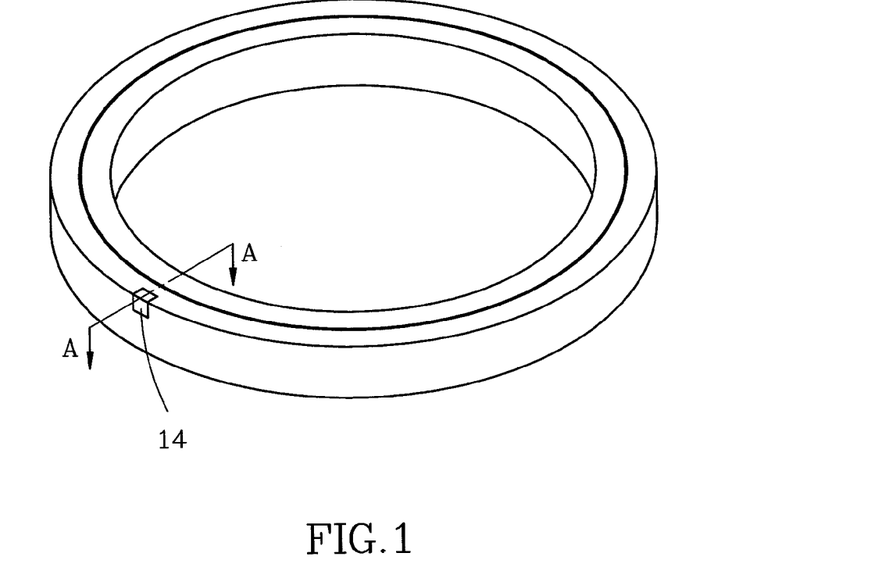
FIG. 1 is a perspective view of a first preferred embodiment of the present invention.
Figure 2:
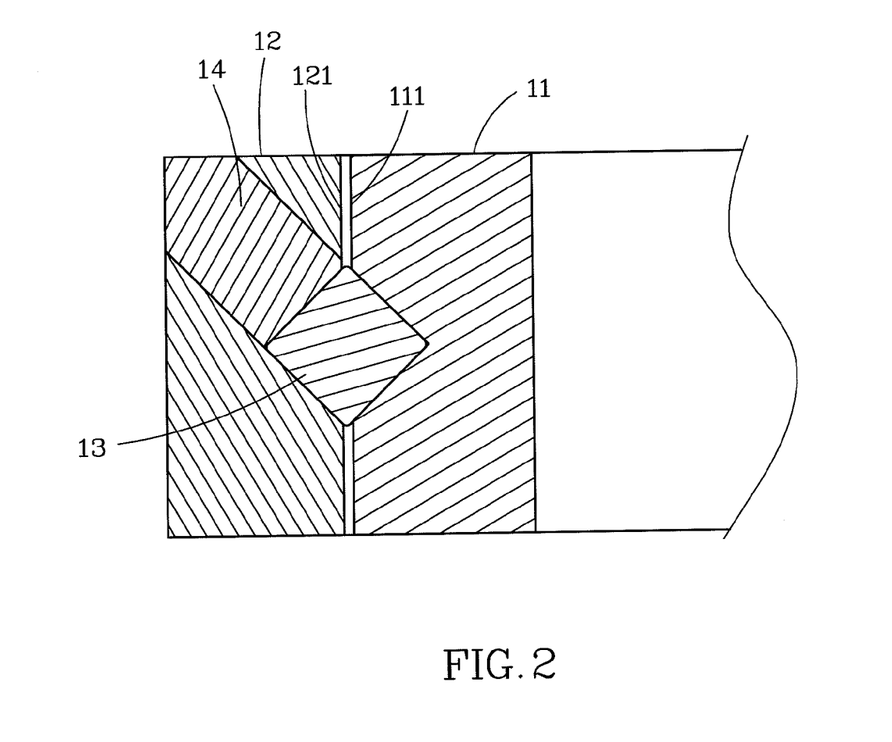
FIG. 2 is a sectional view taken along a line A-A indicated in FIG. 1.
Figure 3:
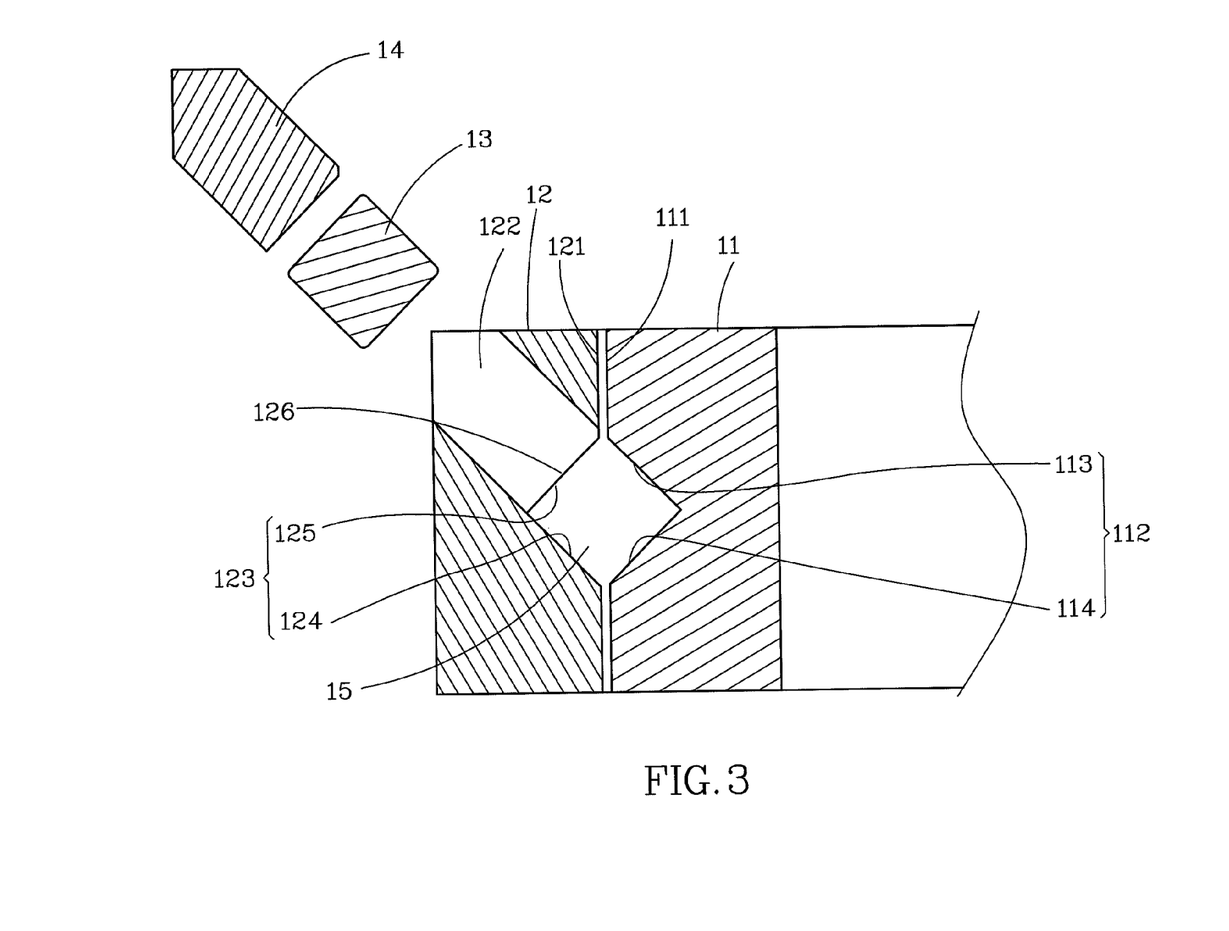
FIG. 3 is a partially sectional exploded view of the first preferred embodiment of the present invention.

Referring to FIGS. 1-3, a cross-roller bearing constructed according to a first preferred embodiment of the present invention is composed of an inner ring 11, an outer ring 12, a plurality of rollers 13, and a plug 14. The detailed descriptions and operations of these elements as well as their interrelations are recited in the respective paragraphs as follows.

The inner ring 11 includes a first periphery 111 and a V-shaped first raceway groove 112 formed on the first periphery 111. The first raceway groove 112 is provided with a complete first raceway surface 113 and a second raceway surface 114.

The outer ring 12 is sleeved onto the inner ring 11 and includes a second periphery 121, an insertion hole 122, and a V-shaped second raceway groove 123 formed on the second periphery 121 and corresponding to the first raceway groove 112. The second raceway groove 123 is provided with a third raceway surface 124 and a fourth raceway surface 125. A receiving space 15 is jointly defined by the first, second, third, and fourth raceway surfaces 113, 114, 124 & 125. The insertion hole 122 extends diagonally through the outer ring 11 in such a way that a breakage 126 is only formed in one of the third and fourth raceway surfaces 124 or 125 to keep the contact area between the other raceway surface and either of the rollers 13 unbroken. In other words, if the breakage is formed on the third raceway surface 124, the fourth raceway surface 125 will be a complete raceway surface. In this embodiment, the insertion hole 122 runs through the fourth raceway surface 125 to from the breakage 126 thereon.

The aforesaid so-called completeness of the raceway surface indicates an endless complete ring whose contact area defined with the roller keeps complete and unbroken. The aforesaid so-called raceway surface indicates the surface which is in effective contact with the roller and allows the roller to roll thereon. The area that the raceway surface extends bilaterally sideward to on purpose does not effectively contact the roller to be anything but the raceway surface, being defined as the non-raceway surface. Whether such non-raceway surface is complete and unbroken or not is irrelevant to the subject matter of the present invention. Applying any other insertion hole or breakage to such non-raceway surface neither affects the completeness of the raceway surface nor has anything to do with whether the raceway surface is unbroken or not.

Figure 4:
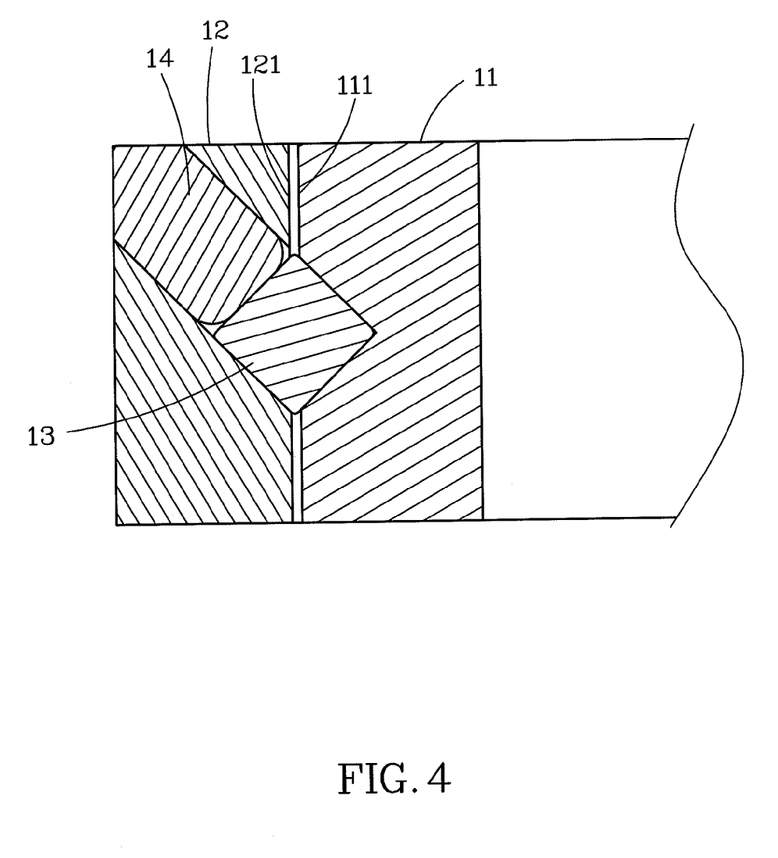
FIG. 4 is a partially sectional view of the first preferred embodiment of the present invention, illustrating that the plug is chamfered to fill the breakage.

Each of the rollers 13 is mounted in the receiving space 15. The plug 14 is mounted in the insertion hole 122 to fill the breakage 126. In FIGS. 1-3, the breakage 126 is filled up by the plug 14. However, whether the breakage 125 should be filled to become completely flat is irrelevant to the subject matter of the present invention. Besides, the plug 14 is not limited to the shape shown in FIGS. 2-3 but the chamfered one as shown in FIG. 4.

It is to be noted that the section of each of the first and second raceway grooves 112 and 123 is V-shaped to enable the section of the receiving space 15 to be quadrangular for fitting the profile of the roller 13.

The rollers 13 are alternately inserted into the receiving space 15 and then the plug 14 is mounted in the insertion hole 122 to fill the breakage 126 in such a way that breakage 126 is flat. When the crossed-roller bearing is forced by a load applied to the inner ring 11 from the outer ring 12, each of the rollers 13 bears an external force from the second raceway groove 123 through the third and fourth raceway surfaces 124 and 125. And then, the external force is transmitted to the first raceway surface 112 and the inner ring 11 through the first and second raceway surfaces 113 and 114 to allow the outer and inner rings 12 and 11 bearing the load to still rotate smoothly.

Figure 5:
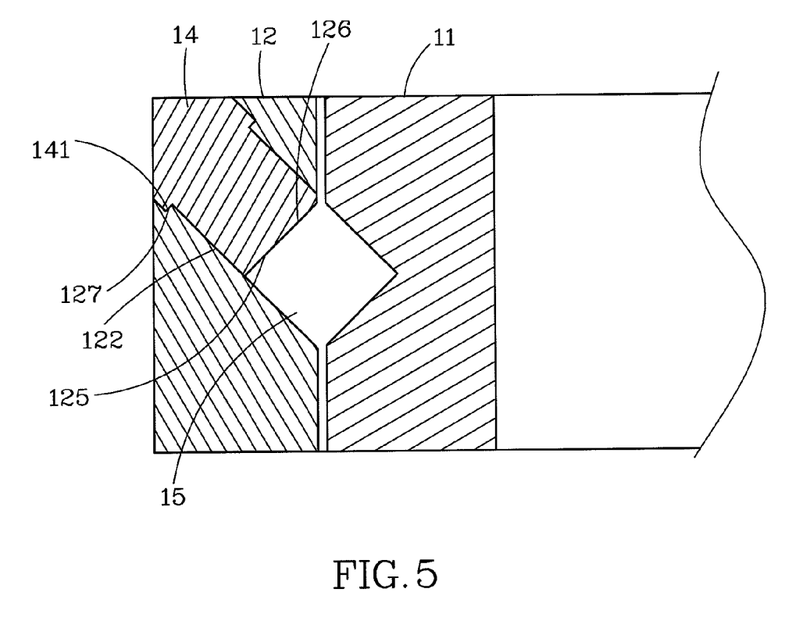
FIG. 5 is a partially sectional view of a second preferred embodiment of the present invention.

Referring to FIG. 5, the cross-roller bearing of a second preferred embodiment of the present invention is similar to that of the first embodiment, having the following difference. To refrain the plug 14 from freely movement toward the receiving space 15, the outer ring 12 is provided with a stepped portion 127 formed on the sidewall of the insertion hole 122. The plug 14 is provided with a stepped part 141 corresponding to the stepped portion 127. The stepped part 141 lies against the stepped portion 127. In this way, the plug 14 can be refrained from movement toward the receiving space 15 to secure the flatness of the fourth raceway surface 15 at the breakage 126.

Figure 6:
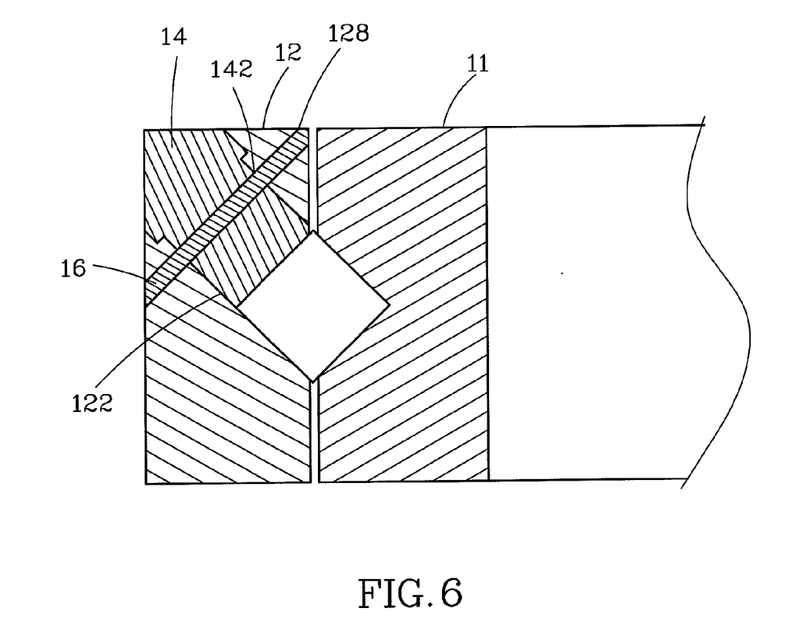
FIG. 6 is a partially sectional view of a third preferred embodiment of the present invention.

Referring to FIG. 6, the cross-roller bearing of a third preferred embodiment of the present invention is similar to that of the first embodiment, having the following difference. To maintain the position of the plug 14, the outer ring 12 is provided with a retaining hole 128 for communication with the insertion hole 122. The plug 14 is provided with a through hole 142 corresponding in position to the retaining hole 128. A retaining pin 16 is inserted into the retaining hole 128 and the through hole 142. In this embodiment, after the retaining pin 16 is inserted into the through hole 142, the retaining pin 16 can hold and prevent the plug 14 from the plug 14 from free movement.

Figure 7:
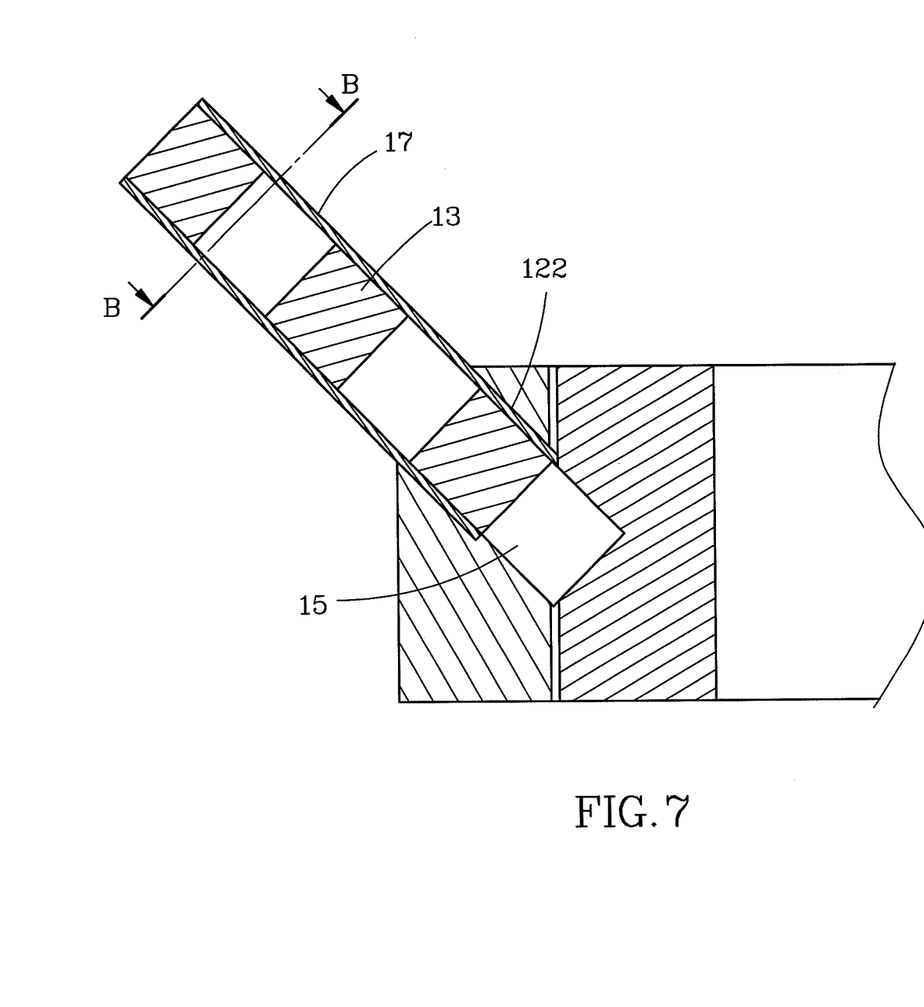
FIG. 7 is a partially sectional view of a fourth preferred embodiment of the present invention.
Figure 8:
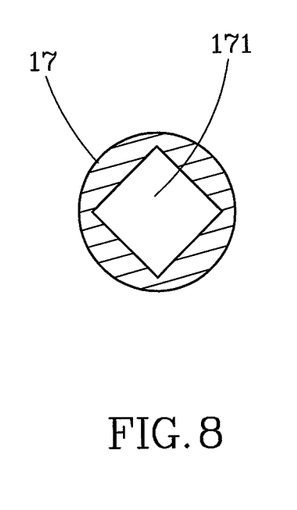
FIG. 8 is a sectional view taken along a line B-B indicated in FIG. 6.
Figure 9:
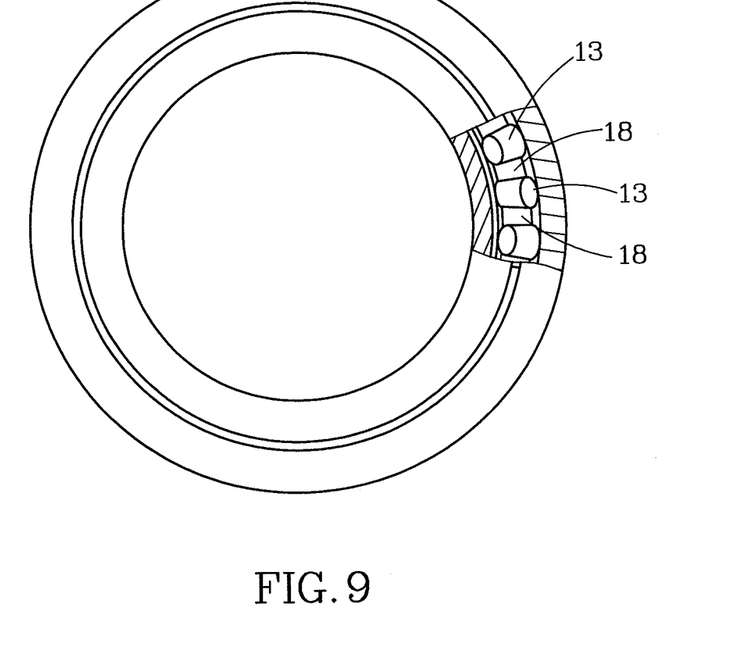
FIG. 9 is schematic view of the fourth preferred embodiment of the present invention.

In the first embodiment, the section of the insertion hole 122 is circular or quadrangular. When the section of the insertion hole 122 is circular, it needs a jig 17 to install the rollers 13 into the receiving space 15. In a fourth preferred embodiment, referring to FIGS. 7-8, the jig 17 is cylindrical and provided with a channel 171 formed therein and having a quadrangular section for putting the rollers 13 into the receiving space 15. Referring to FIG. 9, it is to be noted that a plurality of spacers 18 are mounted among the rollers 13 for reducing noises and frictional resistances resulting from collision of rollers with one another. Each of the spacers 18 is made of polymer.

Figure 10:
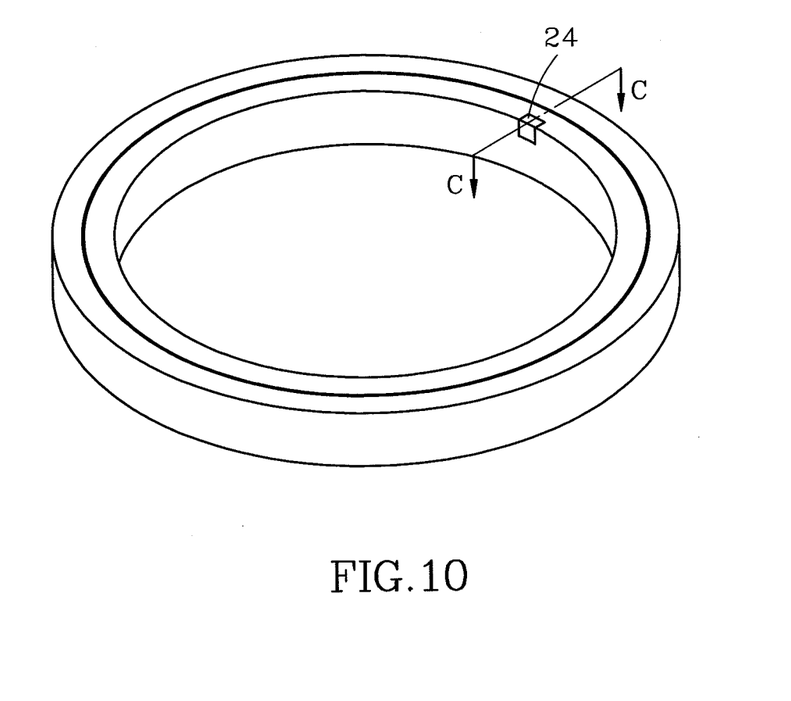
FIG. 10 is a perspective view of a fifth preferred embodiment of the present invention.
Figure 11:
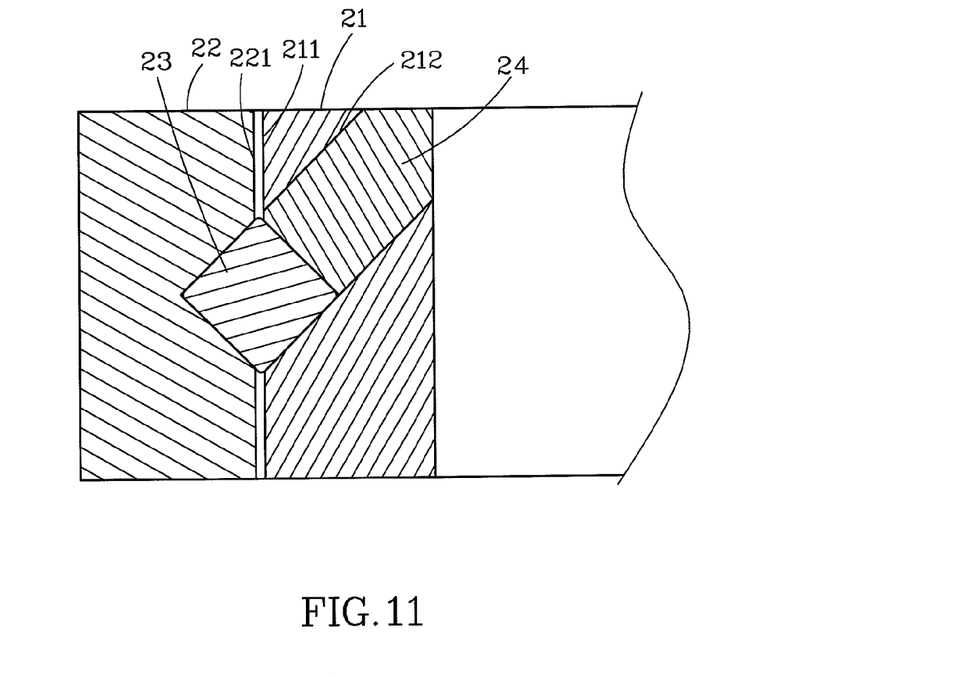
FIG. 11 is a sectional view taken along a line C-C indicated in FIG. 10.
Figure 12:
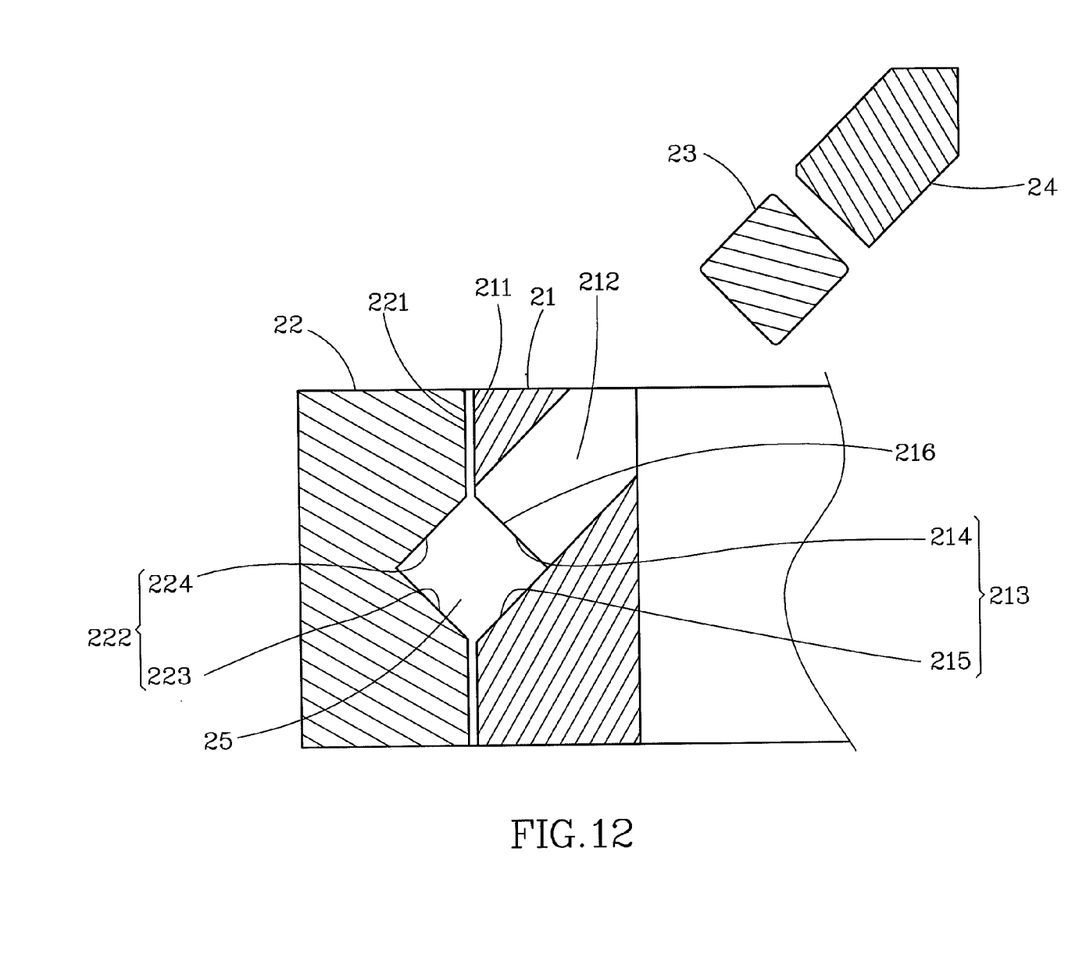
FIG. 12 is partially sectional exploded view of the fifth preferred embodiment of the present invention.

In each of the aforesaid embodiments, the insertion hole 122 is formed on the outer ring 12; however, the insertion hole can be alternatively formed on the inner ring 11. Referring to FIGS. 10-12, the crossed-roller bearing of a fifth preferred embodiment of the present invention is composed of an inner ring 21, an outer ring 22, a plurality of rollers 23, and a plug 24. The detailed descriptions and operations of these elements as well as their interrelations are recited in the respective paragraphs as follows.

The inner ring 21 includes a first periphery 211 and an insertion hole 212. The inner periphery 21 is provided with a V-shaped first raceway 213 formed on the first periphery 211 and having a first raceway surface 214 and a second raceway surface 215. The insertion hole 212 extends diagonally through the inner ring 21 in such a way that a breakage 216 is only formed in one of the first and second raceway surfaces 214 and 215 to keep the contact area between the roller and the other raceway surface. In other words, if the breakage 216 is located at the first raceway surface 214, the second raceway surface 215 will be a complete one. In this embodiment, the insertion hole 212 runs through the first raceway surface 214 and the breakage 216 is formed on the first raceway surface 214.

The outer ring 22 is sleeved onto the inner ring 21 and includes a second periphery 221 and a V-shaped second raceway groove 222 formed on the second periphery 221 corresponding to the first raceway groove 213. The second raceway groove 222 includes a complete third raceway surface 223 and a fourth raceway surface 224. A receiving space 25 is jointly defined by the first, second, third, and fourth raceway surfaces 214-215 & 223-224.

Figure 13:
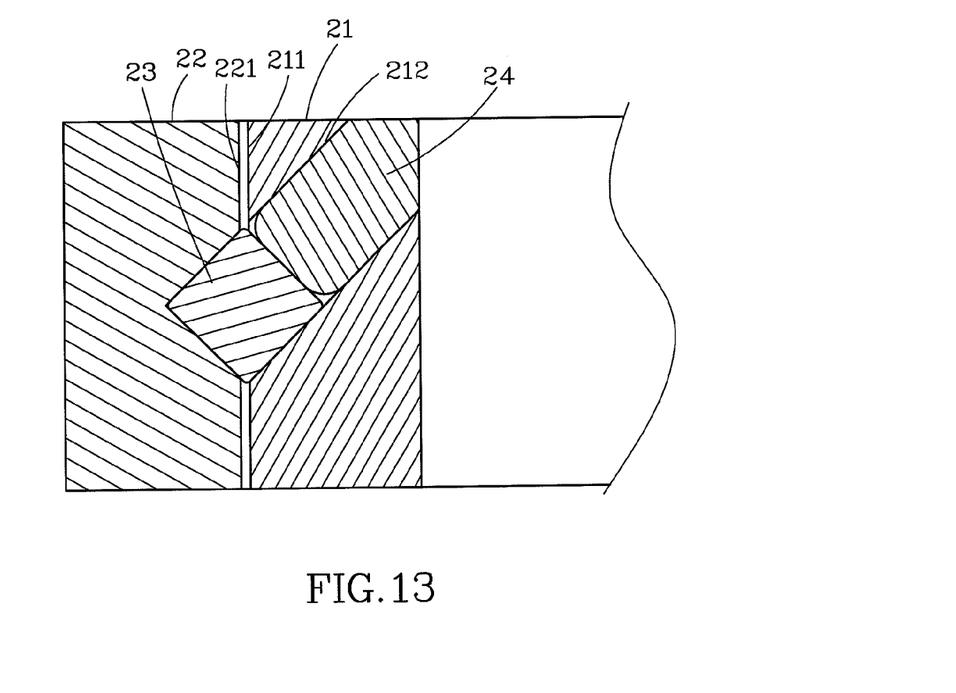
FIG. 13 is similar to FIG. 11, illustrating that the plug is chamfered to fill the breakage.

The rollers 23 are mounted in the receiving space 25 and the plug 24 is mounted in the insertion hole 212 to fill the breakage 216. Besides, as shown in FIG. 13, the plug 14 is chamfered to fill the breakage 216.

It is to be noted that the sections of the first and raceway grooves 213 ad 222 are V-shaped to enable the section of the receiving space to be quadrangular in this embodiment.

The operation manner of the fifth embodiment is identical to that of the first embodiment, so further description thereof is skipped.

Figure 14:
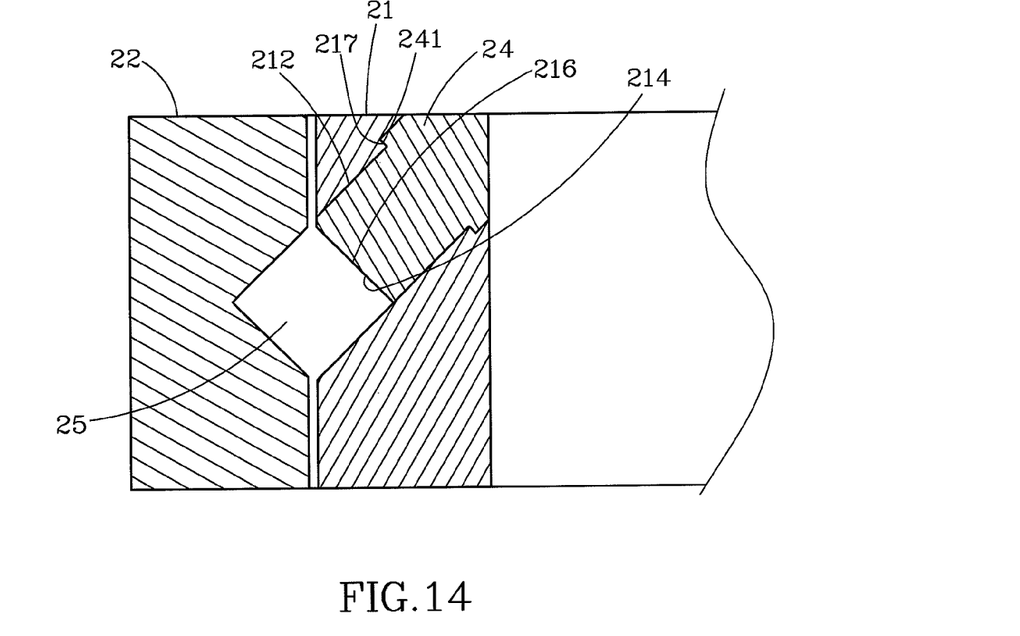
FIG. 14 is a partially sectional view of the sixth preferred embodiment of the present invention.

Referring to FIG. 14, the crossed-roller bearing of a sixth preferred embodiment of the present invention is similar to that of the fifth embodiment, having the following difference. To keep the plug 24 from freely moving toward the receiving space 25, the inner ring 21 is provided with a stepped portion 217 protruding from the wall of the insertion hole 212. The plug 24 is provided with a stepped part 241 corresponding to the stepped portion 217. The stepped part 241 lies against the stepped portion 217. In this way, the plug 24 can be refrained from freely moving toward the receiving space 25 to secure the flatness of the first raceway surface 214 at the breakage 216.

Figure 15:
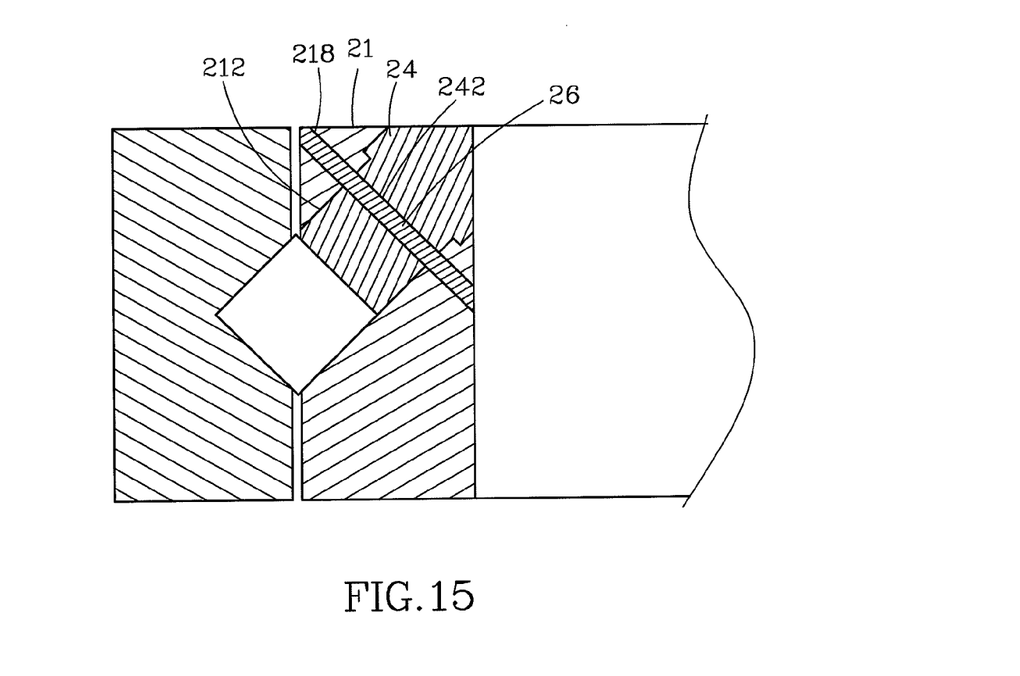
FIG. 15 is a partially sectional view of a seventh preferred embodiment of the present invention.

Referring to FIG. 15, the crossed-roller bearing of a seventh preferred embodiment of the present invention is similar to that of the sixth embodiment, having the following difference. To hold the position of the plug 24, the inner ring 21 includes a retaining hole 218 in communication with the insertion hole 212. The plug 24 includes a through hole 242 corresponding to the retaining hole 218 in position. A retaining pin 26 is inserted into the retaining hole 218 and the through hole 242. In this embodiment, the retaining pin 26 can hold and prevent the plug 24, after being inserted into the through hole 242, from freely movement.

Figure 16:
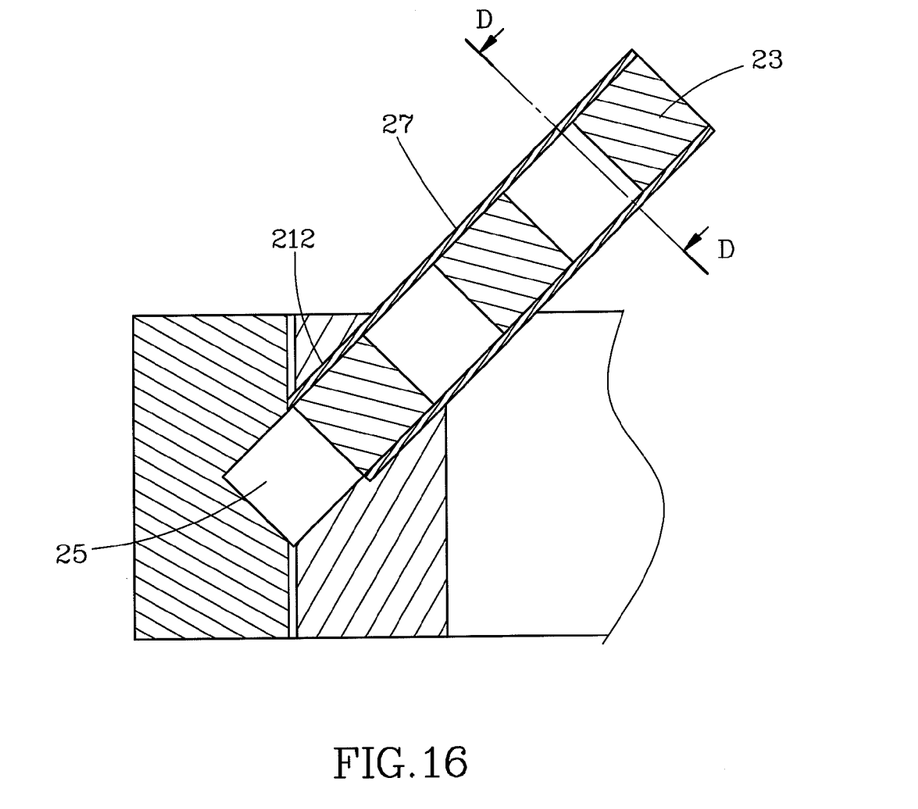
FIG. 16 is a partially sectional view of an eighth preferred embodiment of the present invention.
Figure 17:
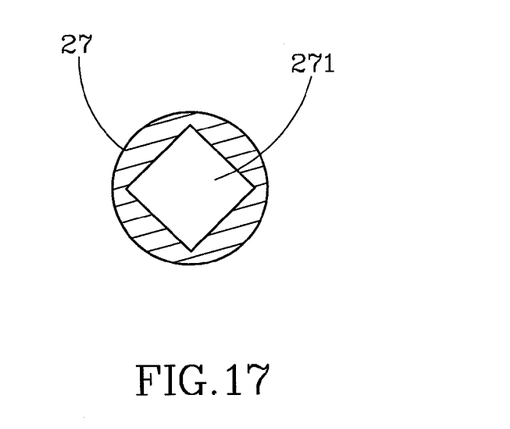
FIG. 17 is a sectional view taken along a line D-D indicated in FIG. 14.
Figure 18:
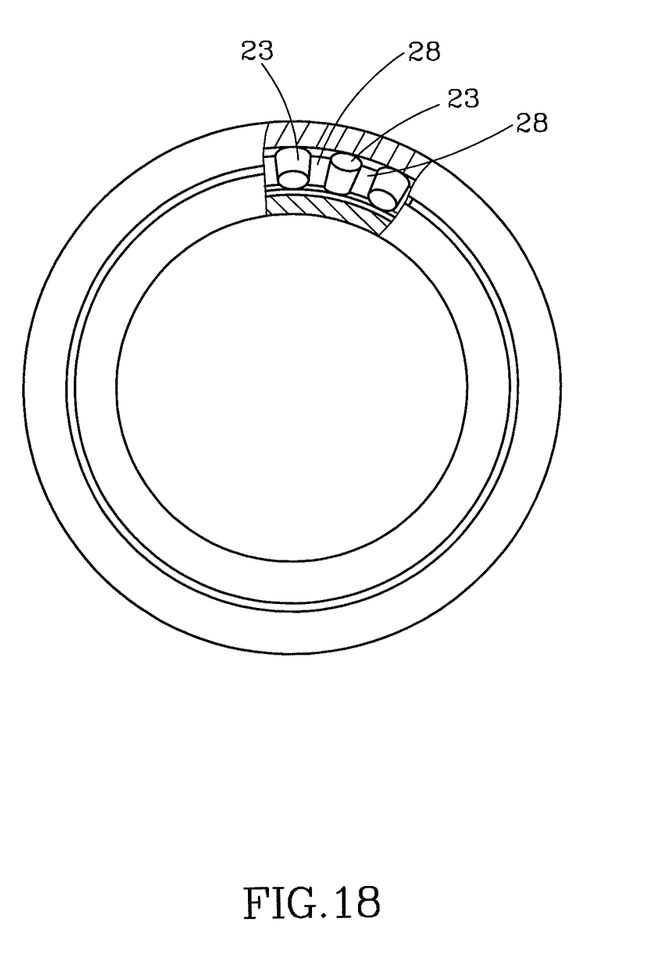
FIG. 18 is schematic view of the eighth preferred embodiment of the present invention.

In fact, the section of the insertion hole 212 in the first embodiment is circular or quadrangular. However, when the section of the insertion hole is circular, a jig 27 is needed for installing the rollers 23 into the receiving space 25. Referring to FIGS. 16-17, the jig 27 is a column internally having a channel 271 whose section is quadrangular for the rollers 23 to be inserted through into the receiving space 25. Referring to FIG. 18, it is to be noted that a plurality of spacers are mounted between the rollers to reduce the noises and frictional resistance resulting from collision of the rollers 23 with one another while the crossed-roller bearing is operated. Each of the spacers 28 is made of polymer is made of polymer.

The crossed-roller bearing of the present invention includes the following advantages.

1. The breakage is formed on only one raceway surface and the contact area between the other abutting raceway surface and the roller remains complete and unbroken, so the contact area between the raceway surface and the roller is larger than that of the prior art to enable the present invention to have more loading capacity than that of the prior art.

2. Compared with the prior art, the breakage in the present invention is located one of the raceway surfaces, so the plug of the present invention only needs one single curved surface formed thereon to fill the breakage. The processing cost of the one single curved surface of the present invention is less than that of the V-shaped complex hyperboloid of the prior art and the yield rate of the former is lower than that of the latter.

Although the present invention has been described with respect to specific preferred embodiments thereof, it is in no way limited to the specifics of the illustrated structures but changes and modifications may be made within the scope of the appended claims.

What is claimed is:

1. A crossed-roller bearing comprising:
   an inner ring having a first periphery and a first raceway groove formed on the first periphery, the first raceway groove having a first raceway surface and a second raceway surface;
   an outer ring sleeved onto the inner ring and having a second periphery, an insertion hole, and a second raceway groove formed on the second periphery and corresponding to the first raceway groove, the second raceway groove having a third raceway surface and a fourth raceway surface, a receiving space being jointly defined by the first, second, third, and fourth raceway surfaces, the insertion hole extending diagonally through the outer ring in such a way that a breakage is only formed in one of the third or fourth raceway surfaces;
   a plurality of rollers received in the receiving space; and
   a plug mounted in the insertion hole to fill the breakage.

2. The crossed-roller bearing as defined in claim 1, wherein each of the first and second raceway grooves comprises a V-shaped section.

3. The crossed-roller bearing as defined in claim 1, wherein the outer ring comprises a stepped portion protruding from the wall of the insertion hole; the plug comprises a stepped part corresponding to the stepped portion of the outer ring, the stepped part lying against the stepped portion.

4. The crossed-roller bearing as defined in claim 1, wherein the outer ring comprises a retaining hole communicating with the insertion hole; the plug comprises a through hole corresponding to the retaining hole in position; a retaining pin inserted into the retaining hole and the through hole.

5. The crossed-roller bearing as defined in claim 1 further comprising a plurality of spacers mounted between the rollers.

6. The crossed-roller bearing as defined in claim 1, wherein the first and second race surfaces are complete.

7. The crossed-roller bearing as defined in claim 1, wherein the breakage is located at the third raceway surface and the fourth raceway surface is complete.

8. The crossed-roller bearing as defined in claim 1, wherein the breakage is located at the fourth raceway surface and the third raceway surface is complete.

9. The crossed-roller bearing as defined in claim 1, wherein the insertion hole comprises a circular or quadrangular section.

10. A crossed-roller bearing comprising:
    an inner ring having a first periphery, an insertion hole, and a first raceway groove formed on the first periphery, the first raceway groove having a first raceway surface and a second raceway surface, the insertion hole extending diagonally through the inner ring in such a way that a breakage is only formed in one of the first or second raceway surfaces;
    an outer ring sleeved onto the inner ring and having a second periphery and a second raceway groove formed on the second periphery and corresponding to the first raceway groove, the second raceway groove having a third raceway surface and a fourth raceway surface, a receiving space being jointly defined by the first, second, third, and fourth raceway surfaces;
a plurality of rollers received in the receiving space; and
a plug mounted in the insertion hole to fill the breakage.

11. The crossed-roller bearing as defined in claim 10, wherein each of the first and second raceway grooves comprises a V-shaped section.

12. The crossed-roller bearing as defined in claim 10, wherein the inner ring comprises a stepped portion protruding from the wall of the insertion hole; the plug comprises a stepped part corresponding to the stepped portion of the outer ring, the stepped part lying against the stepped portion.

13. The crossed-roller bearing as defined in claim 10, wherein the inner ring comprises a retaining hole communicating with the insertion hole; the plug comprises a through hole corresponding to the retaining hole in position; a retaining pin inserted into the retaining hole and the through hole.

14. The crossed-roller bearing as defined in claim 10 further comprising a plurality of spacers mounted between the rollers.

15. The crossed-roller bearing as defined in claim 10, wherein the third and fourth race surfaces are complete.

16. The crossed-roller bearing as defined in claim 10, wherein the breakage is located at the first raceway surface and the second raceway surface is complete.

17. The crossed-roller bearing as defined in claim 10, wherein the breakage is located at the second raceway surface and the first raceway surface is complete.

18. The crossed-roller bearing as defined in claim 10, wherein the insertion hole comprises a circular or quadrangular section.

\* \* \* \* \*